United States Patent [19]

Deutsch et al.

[11] Patent Number: 4,649,446
[45] Date of Patent: Mar. 10, 1987

[54] SWITCHING MECHANISM FOR THE DECK OF A MAGNETIC-TAPE-CASSETTE APPARATUS

[75] Inventors: Arnim Deutsch; Henricus M. Ruyten, both of Wetzlar, Fed. Rep. of Germany

[73] Assignee: U.S. Philips Corporation, New York, N.Y.

[21] Appl. No.: 691,994

[22] Filed: Jan. 16, 1985

[30] Foreign Application Priority Data

Jan. 19, 1984 [DE] Fed. Rep. of Germany ....... 3401691

[51] Int. Cl.⁴ .......................... G11B 5/54; G11B 15/00
[52] U.S. Cl. ..................................... 360/105; 360/963; 360/93
[58] Field of Search .................. 360/105, 90, 93, 96.3, 360/96.4, 137

[56] References Cited

U.S. PATENT DOCUMENTS 4,225,894 9/1980 Fulukawa et al. ............. 360/96.3 X
4,404,610 9/1983 Koizumi et al. ................ 360/105 X
4,471,398 9/1984 Kommoss et al. ............. 360/96.4 X
4,568,989 2/1986 Ohhara et al. ........................ 360/90

Primary Examiner—John H. Wolff
Attorney, Agent, or Firm—David R. Treacy

[57] ABSTRACT

A head-mounting plate is movable between a latched play position, a standby position and a withdrawn position. The plate is moved from the play to the standby positions when the end of the tape is reached or when an actuating rod is depressed slightly. The rod has a guide slot for unlatching the plate, and a switching surface for a tape transport drive switch. A pivotal member on the plate clears the drive switch when in a first pivotal position, and opens the switch during return of the plate to the standby position when in a center position. Upon re-depression and movement of the rod in a specific direction, a stop on the rod moves the member to the first pivotal position. After this re-depression the switch is closed during return movement of the rod in the opposite direction, and a servomechanism moves the head plate from the standby to the play positions.

12 Claims, 9 Drawing Figures

SWITCHING MECHANISM FOR THE DECK OF A MAGNETIC-TAPE-CASSETTE APPARATUS

BACKGROUND OF THE INVENTION

The invention relates to a switching mechanism for the deck of a magnetic-tape-cassette apparatus comprising a head-mounting plate which can be moved forwards and backwards relative to the magnetic tape to be scanned. Such a plate is latched in the forward position in the play mode and, when unlatched, can typically be moved back under spring pressure to a standby position, in which the cassette remains inside the deck, either when the end of the tape is reached or when an actuating rod is pressed inwards. The actuating rod is provided with a guide slot by means of which the head-mounting plate is unlatched and with a switching profile for the actuation of a drive switch of the deck mechanism.

Such an apparatus is disclosed in EP-A-0072 586 to which U.S. Pat. No. 4,561,030 corresponds. The deck can be set to standby by depressing an eject button over a short length. In this standby position the cassette remains inside the apparatus and the tape transport steps. When the button on the actuating or push-button rod is depressed the head-mounting plate is manually brought into the play position in which it is latched by electromagnetic means. Depression of the push-button demands a forceful effect which is regarded as undesirable in modern equipment. In such equipment actuation is preferably effected by gently touching the actuating buttons. Such an easy actuation is particularly desirable if the apparatus should be set from standby to play without prior ejection and re-insertion of a cassette.

SUMMARY OF THE INVENTION

The invention aims at providing a switching mechanism which enables the deck to be set from standby to playing with a gentle depression of a button by means of a servomechanism.

According to the invention this is achieved in that the head-mounting plate carries a pivotable actuating member which, when in a center position during the return of the head-mounting plate to the standby position, can switch off the drive switch; and in a first pivotal position does not influence the drive switch, the actuating member comprises a switching surface by means of which the drive switch is switched off when the head-mounting plate returns to the standby position if the actuating member is in its center position, the actuating member is moved from the center position to the first pivotal position by means of a stop on the actuating rod if the actuating rod is moved in a direction of depression after re-depression, the drive switch is switched on after this re-depression when the actuating rod moves back in the opposite direction, after which a servomechanism, thus started, of the deck moves the head-mounting plate from the standby position to the play position.

In this way the drive switch can be switched off both by the head-mounting plate and by the actuating rod. The head-mounting plate can now return to the standby position both when the end of tape is reached and when the apparatus is set to standby. Since the drive switch has been set to the off position the deck cannot be set to the play mode by means of the servomechanism without a special command. However, if the head-mounting plate should be moved forwards again into the playing position, without manual effect, the drive switch must first switch on the servomechanism to enable the head-mounting plate to be moved to the playing position. This is achieved by means of the pivotally mounted actuating member which can be set from the center position in which it switched off the drive switch to the first pivotal position in which it does not influence the drive switch. This is effected by a gentle re-depression of the actuating rod, which causes the stop to pivot the actuating member into the first pivotal position. This gentle depression of the actuating rod enables the head-mounting plate to be set from the standby position to the play position.

In a further embodiment of the invention the actuating member remains in the first pivotal position when the actuating rod is moved back in the opposite direction, and the drive switch remains closed when the actuating member pivots back into the center position past the drive switch under spring force as the head-mounting plate is moved forwards to the play position. This ensures that during the return movement of the actuating rod after brief re-depression, the drive switch is not immediately opened by the actuating member. Thus, the servomechanism can move the head-mounting plate freely into the play position. During the forward movement of the head-mounting plate the actuating member pivots back into the center position, so that it is ready for another return to the standby position.

In the preferred embodiment of the invention it is advantageous that after the actuating member has been pivoted into the first pivotal position it is latched in this pivotal position if the actuating rod moves back in the opposite direction, and unlatching is effected if the head-mounting plate moves to the play position. This latching ensures that the actuating member cannot resume its center position until the servomechanism has been started and the head-mounting plate moves towards the play position.

In a further embodiment of the invention the actuating member is a one-arm pivotal lever which is pivotable about a pivot and which is spring-loaded to return automatically from its first pivotal position to its center position. Such a pivotal lever is a simple element which can always return to its center position when it is unlatched during the movement of the head-mounting plate to the play position.

In still another embodiment of the invention the switching surface is situated on the free end of the pivotal lever and the pivotal lever comprises an extension which projects from the free end of the lever to cooperate with a latching hook. Thus, the pivotal lever can perform two functions. One function is to open the switch by means of the switching surface and the other function is to latch the lever in its first position.

In yet another embodiment of the invention the pivotal lever can be pivoted from its first position into a second position via the center position by means of the stop. In this second position the pivotal lever does not influence the drive switch. The use of the second pivotal position ensures that when a cassette is inserted into the apparatus, which causes the switching profile on the actuating rod to close the drive switch, the actuating member cannot block the drive switch. This is important because this guarantees that the operation of the servomechanism is not disturbed.

In a further embodiment of the invention the pivotal lever has a widened portion which extends perpendicularly to the central axis of the lever near its pivot. The spring is tensioned by this portion and urges the pivotal lever back into its center position. This is a very favorable construction for a pivotal lever which can pivot in two directions from its center position.

In another embodiment of the invention the actuating rod is an ejection rod which carries a guide pin which follows a guide surface of a loading and ejection lever. Such a guide surface preferably comprises an oblique portion onto which the guide pin runs when the button on the ejection rod is depressed again, thereby causing a distinct increase in resistance to depression and indicating that the pivotal lever has reached the first position. This, via the actuating rod the loading and ejection lever can also influence the actuation of the drive switch. When the head-mounting plate is in the standby position and should be set to the play position by re-depression of the actuating rod, the guide pin in combination with the oblique surface provides an indication to the user that the actuacting rod has been depressed far enough and the pivotal lever is latched in the first pivotal position for restarting the deck and closing the drive switch.

An embodiment of the invention will be described in more detail, by way of example, with reference to the accompanying drawings.

DESCRIPTION OF THE PREFERRED EMBODIMENT

Figure 1:
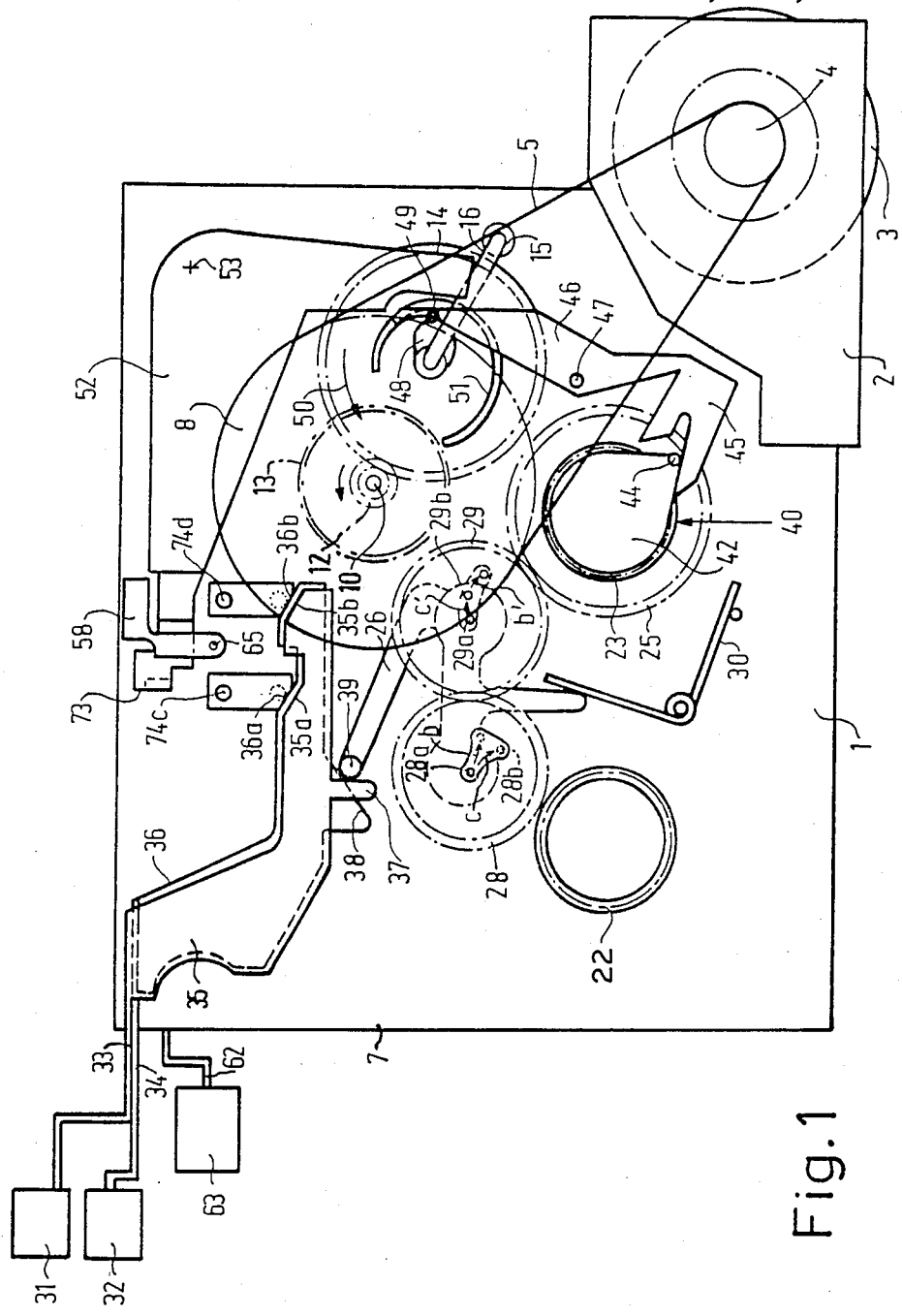
FIG. 1 is a diagrammatic view of the driving side of the magnetic-tape-cassette apparatus.

The magnetic-tape-cassette apparatus shown in FIG. 1 comprises a frame 1 which carries a non-reversible drive motor 3 on a support 2. The drive pinion 4 of the motor 3 guides a belt 5, which is passed along a flywheel 8. The flywheel 8 is journalled in the frame 1 and is rigidly connected to a capstan 10. Moreover, the flywheel 8 is connected to a gear wheel 12. Through a slipping clutch a further gear wheel 13, which is coaxial with the gear wheel 12 is arranged to be rotatable relative to the flywheel 8. A switching wheel 14 in the form of a gear wheel is constantly in mesh with the gear wheel 12 on the flywheel 8. This gear wheel 14 is arranged to be pivotable about a spindle 15. The spindle 15 carries a pivotal arm 16, shown schematically in FIG. 1, on which the switching wheel 14 is mounted for rotation.

As is also shown in FIGS. 3 to 8, winding spindles 20 and 21 are rotatably journalled in the frame 1. These winding spindles 20 and 21 are rigidly connected to fast-wind wheels 22, 23. Through a slipping clutch a play wheel 25 is coupled to the winding spindle 21.

Figure 5:
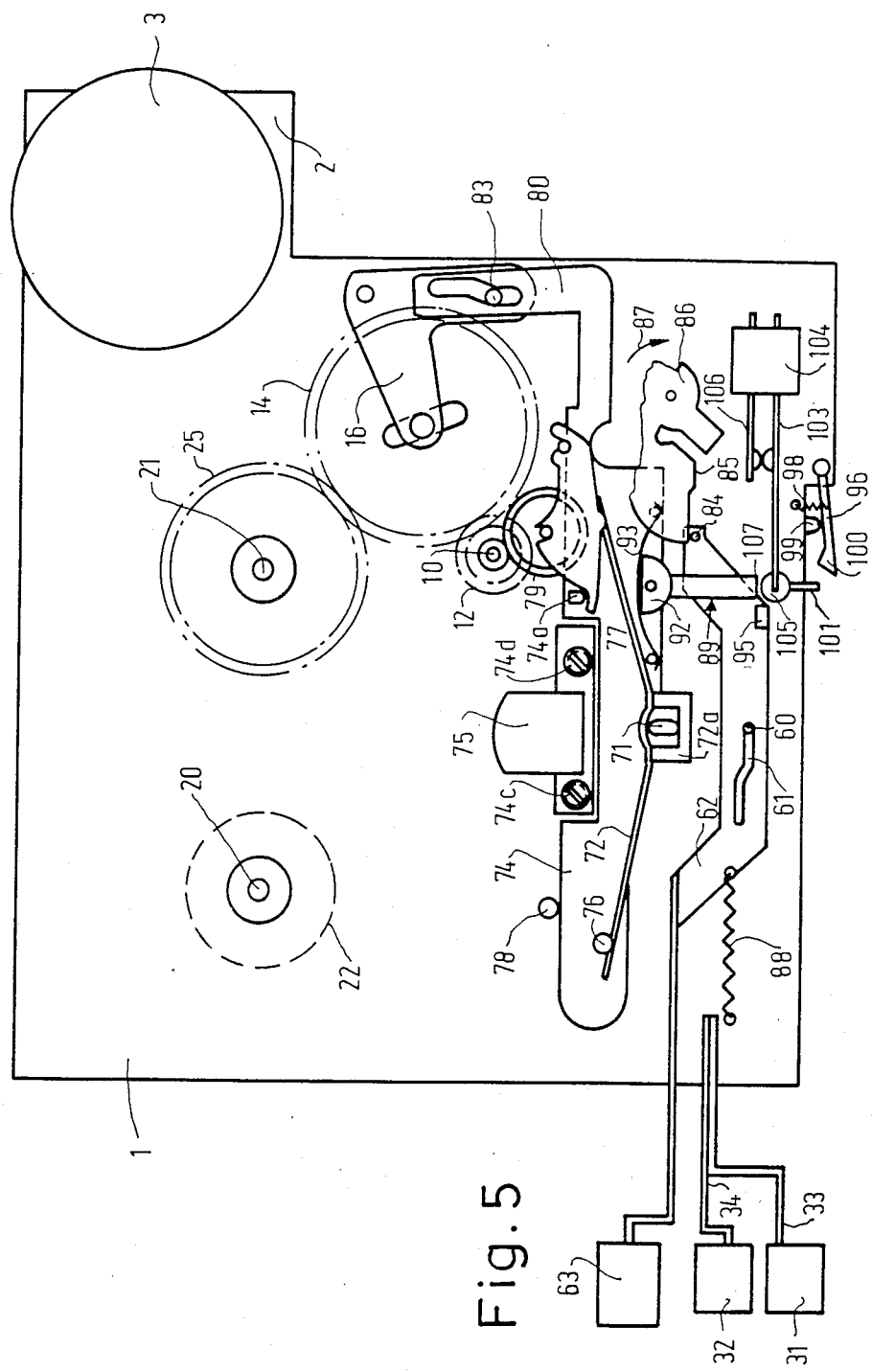
FIG. 5 shows the apparatus with the head-mounting plate in the play position after the servomechanism has been switched off.

FIG. 5 shows how the play wheel 25 is driven by the gear wheel 12 through the switching wheel 14.

A member 26, which is movably guided in the frame 1, carries two gear wheels 28, 29 adjacent each other (see FIG. 1). A spring 30 urges the member 26 towards an initial position shown in FIG. 1. The member 26 carries two pins 28a and 29a, which are movably guided in a triangular hole 28b and a slot 29b, respectively, in the frame 1.

For fast forward and reverse winding there are provided two buttons 31 and 32. These buttons 31, 32 are connected to slides 35, 36 through the push-button rods 33 and 34. These slides 35 and 36 cooperate with the member 26. For this purpose the slide 35 is formed with a projection 37 and the slide 36 is formed with a guide surface 38. The projection 37 and the guide surface 38 cooperate with a pin 39 on the member 26. The slides 35, 36 further comprise guide surfaces 35a, 35b and 36a, 36b respectively, which can cooperate with pins 74c, 74d of a head plate 74 (FIGS. 1, 3 to 8).

When as a result of the depression of the fast-wind button 31 the projection 37 is urged against the pin 39 on the member 26, the gear wheel 29 first comes into mesh with the gear wheel 13. The pins 28a and 29a then move in the directions indicated by the arrows b and c', respectively. As the movement continues, the pin 29a moves further in the direction indicated by the arrow b', as a result of which the gear wheel 29 also meshes with the gear wheel 23. The magnetic tape is now wound rapidly by the winding spindle 21. If the other fast-wind button 32 is depressed the guide surface 38 acts on the pin 39 on the member 26. The pins 28a and 29a then move in the directions indicated by the arrows c and c', respectively, so that the gear wheel 29 meshes with the gear wheel 13 and the gear wheel 28 meshes with the gear wheel 22. In this way the other winding spindle 20 is now driven for fast winding.

Figure 3:
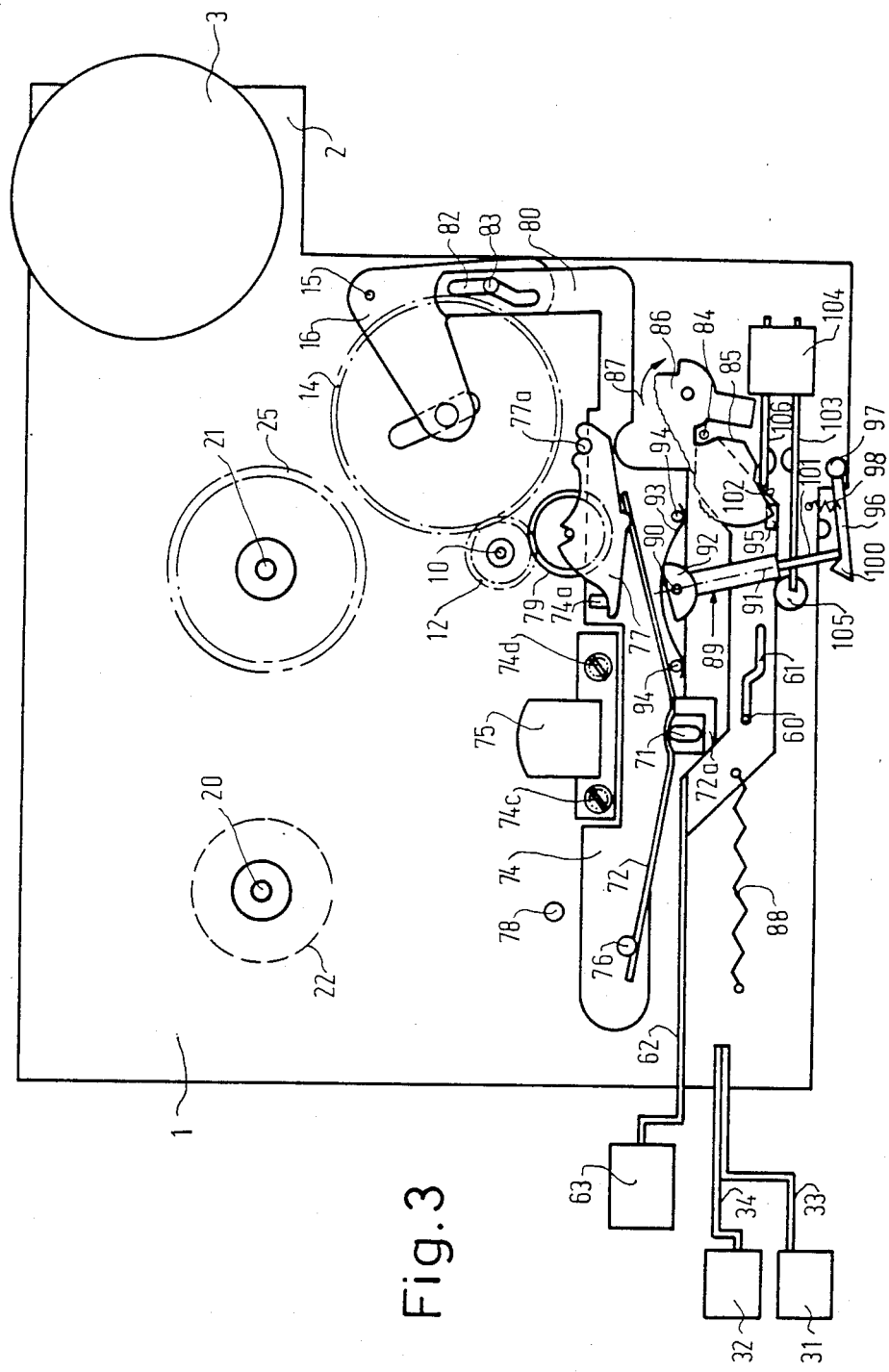
FIG. 3 shows the magnetic-tape-cassette apparatus from the audio head with the cassette removed.
Figure 4:
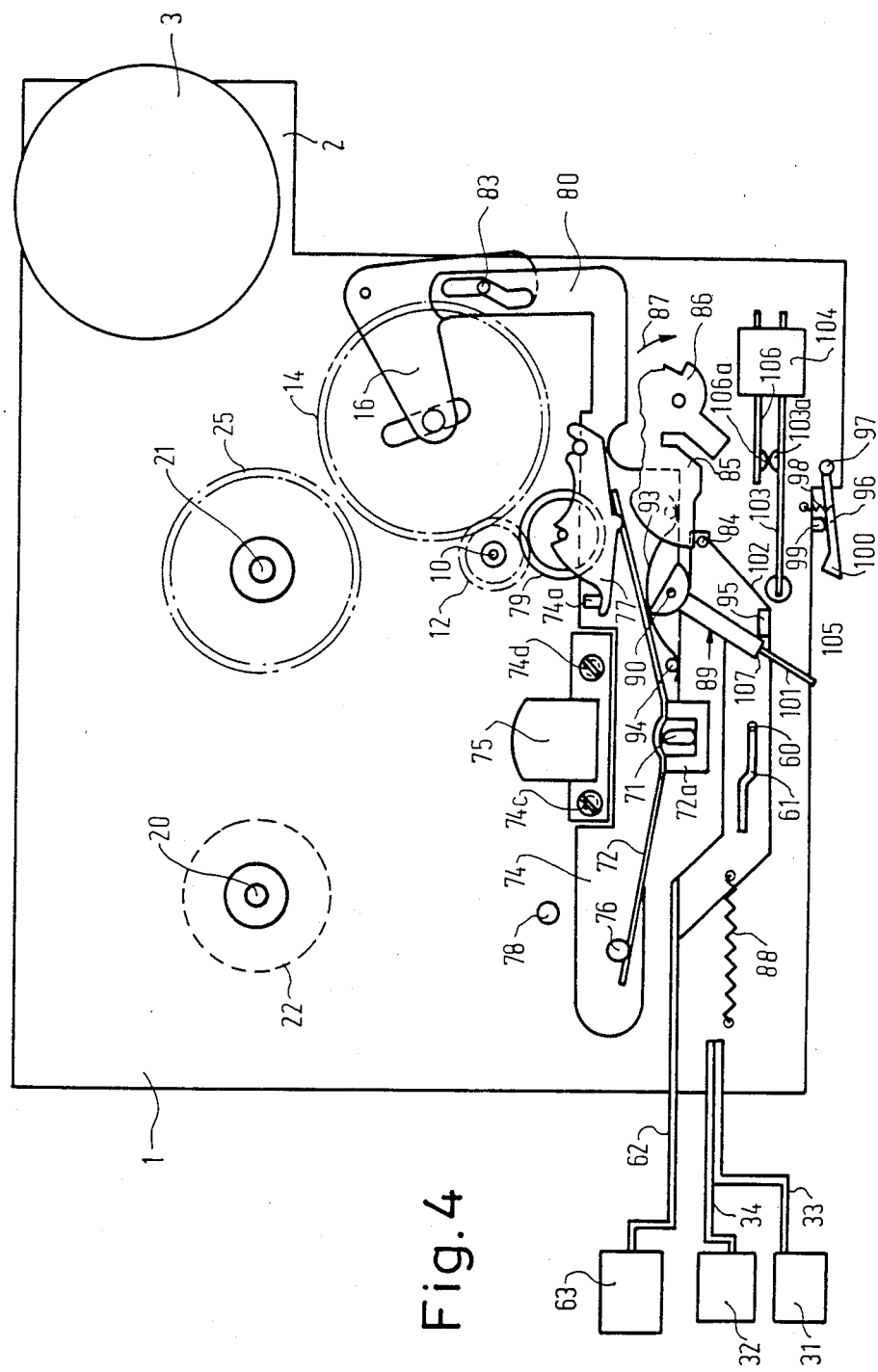
FIG. 4 shows the apparatus from the audio head side with inserted cassette and with the servomechanism started to advance the head-mounting plate.

When the head-mounting plate 74 has reached a playing position, the pins 74c, 74d assume one of the broken-line-positions shown in FIG. 1. This position corresponds to the position shown in FIG. 5. Actuating the push-button rods 33 and 34, respectively, has the result that, via the guide surfaces 35a, 35b and 36a, 36b, respectively, the pins 74c, 74d and hence the head-mounting plate 74 are moved to the upwards so that a sound head 75 and a pressure roller 79 are lifted off the magnetic tape into a standby position (FIGS. 3, 4).

A detection means 40, comprising a disc 42 is connected to the winding spindle 21 through a slipping clutch. A pin 44 arranged on the disc 42 engages with a switching fork 45. The switching fork 45 is arranged on a switching member 46, which is pivotable about a pivot 47 (see also FIGS. 2A and 2B). The switching wheel 14 carries a central slightly elliptical projection 48. The switching member 46 extends over the switching wheel 14 and carries a pin 49, which when the switching member 46 has pivoted inwards slides over the circumference of the projection 48 when the switching wheel is rotated in the direction indicated by an arrow 50.

Around the projection 48 a spiral guide wall 51 is formed on the switching wheel 14 at a larger distance. This guide wall 51 can also cooperate with the pin 49 on the switching member 46, namely when the detection means detects tape stoppage. The pin 44 then no longer urges against the switching fork 45, so that the pin 49 on the switching member 46 is no longer moved inwards towards the projection 48 but remains in the same position and, as the switching wheel 14 continues to rotate in the direction indicated by the arrow 50, reaches the outer side of the guide wall 51. Since the guide wall 51 is spiral-shaped the switching member 46 will be pivoted clockwise about the pivot 47, so that the switching member 46 is urged against a connecting member 52. The switching member is then pivoted in the direction indicated by the arrow 46a.

Figure 2A:
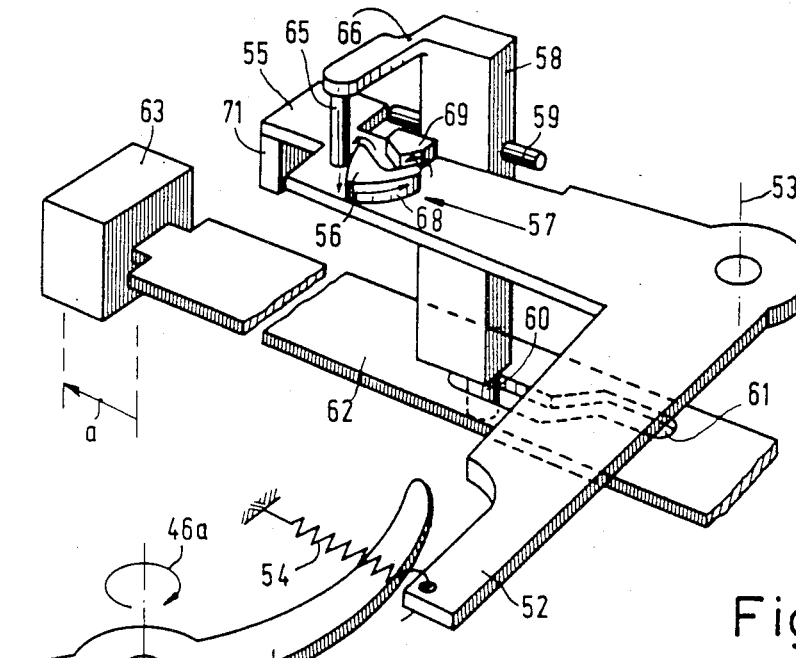
FIG. 2A is an enlarged-scale perspective view of a servomechanism of the apparatus in a first functional position.
Figure 2B:
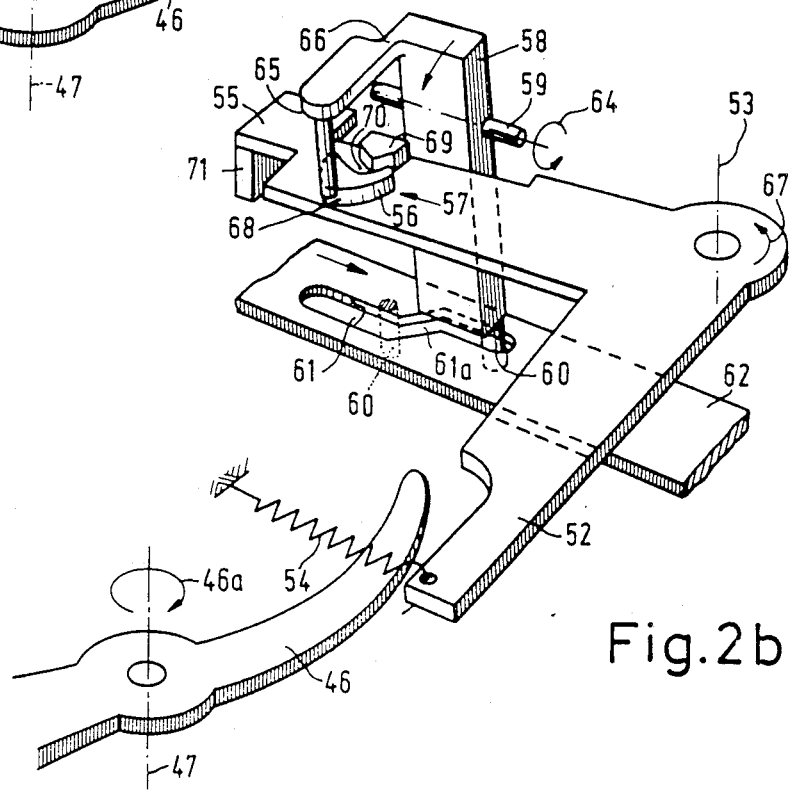
FIG. 2B shows the servomechanism of FIG. 2A in a second functional position.

The connecting member 52 is a lever having two arms, which lever is pivotable about a pivot 53. As can be seen in FIGS. 2A and 2B, the connecting member 52 is spring-biased in the clockwise direction by a spring 54. Thus, the clockwise movement of the switching member 46 tensions the spring 54.

The lever arm 55 of the connecting member 52 which is remote from the point of engagement with the switching member 46 carries a heart-shaped projection 56 which forms part of a latching mechanism 57. The latching mechanism 57 also comprises a latching lever 58, which can be pivoted relative to the frame about a spindle 59. The spindle 59 extends parallel to the upper surface of the frame 1. The latching lever 58 carries a guide pin 60 on its side which faces the heart-shaped projection 56, which pin extends through a guide slot 61 in an actuating rod 62 of a stop/eject button 63. The guide slot 61 has such a shape that the latching lever 58, as can be seen in FIG. 2B, is pivoted about the spindle 59 in the direction indicated by an arrow 64 when the push-button rod has moved outwards. The outward movement of the stop/eject button 63 and the rod 62 is obtained by inserting a magnetic-tape cassette into the apparatus.

The actuating rod 62 carries a guide pin 84 which follows a profile 85 of a loading and ejection lever 86 (shown partly in FIGS. 4 to 8). For the construction and operation of the lever 86 reference is made to the nonprepublished German Patent Application No. P 33 12 136.2 to which U.S. Pat. No. 4,623,945 corresponds (allowed application Ser. No. 06/593,799).

As is shown in FIGS. 3 and 4 the guide pin 84 follows the profile 85 after insertion of a cassette, the guide pin 84 and hence the actuating rod 62 being released to move outwards by the pivotal movement of the loading and ejection lever 86 in the direction indicated by an arrow 87.

FIG. 2A shows the rod 62 in the inward position and FIG. 2B the rod 62 in the outward position.

The latching lever 58 carries a latching pin 65, which can engage with and pass around the heart-shaped projection 56, which is achieved by means of, for example, an integral hinge 66. In FIG. 2A (corresponding to the position of the rod 62 in FIG. 3) the pin 65 is situated above the heart-shaped projection 56, because the rod 62 is depressed. In FIG. 2B, in which the actuating rod 62 has moved to the outward position (shown in FIG. 4), the pin 65 is positioned in the area where it can engage with the heart-shaped projection 56. The pin 65 can then cooperate with the heart-shaped projection 56 when the switching member 46 pivots the connecting member 52 in the counterclockwise direction indicated by an arrow 67, as shown in FIG. 2B. During this pivotal movement the pin 65 has moved past a side wall 68 of the heart-shaped projection 56. A guide 69 ensures that the pin 65 engages in a recess 70 in the heart-shaped projection 56.

The lever arm 55 carries a limb 71. As can be seen in FIGS. 3 to 8, this limb 71 cooperates with a blade spring 72 and a portion 72a of the blade spring 72 and extends through a slot 73 in the frame 1. With its free ends the blade spring 72 acts against a member 77 which is journalled in the head-mounting plate 74 so as to be pivotable about a spingle 77a. In its centre this head-mounting plate 74 carries an audio head 75 and to the right of the head 75 the member 77 in which the pressure roller 78 is journalled. The member is urged against a stop 74a on the head-mounting plate 74 in the retracted position of this plate 74.

The head-mounting plate 74 has an angular end-portion 80. The end portion 80 is formed with a slot 82, in which a pin 83 is movable, which pin is mounted on the pivotal arm 16. Thus, in the position shown in FIG. 3, the pivotal arm 16 has pivoted about the spindle 15 in such a manner that the switching wheel 14 is in mesh with the play wheel 25 and the gear wheel 12. Moreover, in the position shown in FIG. 5 the pressure roller 79 is urged against the capstan 10 in which position the member 77 is clear of the stop 74a.

A one-arm pivotal lever 89 is arranged on the head-mounting plate 74 so as to be pivotable about a pivot 90. Near the pivot 90 the lever 89 has a widened portion 92 which extends perpendicularly to its central axis 91. A spring 93 which acts against pins 94 on the head-mounting plate 74 is tensioned by means of this widened portion 92. The spring 93 ensures that the via the widened portion 92 the pivotal lever 89 is always urged back into the center position (FIG. 5). Further, the lever 89 can pivot into two further positions to the left and the right of the center position. The first pivotal position can be reached by abutment of a stop 95 with the actuating rod 62 (FIG. 7), in which first position the lever 89 is latched by a latching lever 96. This latching lever 96 is mounted on the frame 1 so as to be pivotable about a spindle 97. A spring 98 constantly urges the latching lever 96 against a stop 99. At its free front end the latching lever 96 carries a latching hook 100 which is wedge-shaped towards the pivotal lever 89. This wedge shape serves to enable an extension 101 of the lever 89 to engage behind the hook 100 and to be latched behind this hook when the pivotal lever 89 moves from the position shown in FIG. 6 to the position shown in FIG. 7.

The actuating rod 62 has a guide profile 102 which cooperates with a contact arm 103 of a drive switch 104. The contact arm 103 carries a contact nose 105 which is shown to lie against the guide portion 102 in FIGS. 3 and 7. There is provided a second contact arm 106 which can establish contact with the contact arm 103 via contact points 103a, 106a to close the switch 104.

The switching mechanism operates as follows. When a cassette is inserted the push-button rod 62 moves from the position shown in FIGS. 2A and 3 to the position shown in FIGS. 2B and 4. The contact nose 105 of the contact arm 103 then slides along the guide portion 102 until the contact points 103a and 106a are in contact with each other. The drive switch 104 is then closed and the central drive motor 3 is started. During the outward movement of the actuating rod 62 the stop 95 has moved the pivotal lever 89 out of the latched position behind the latching hook 100 to the left into the second position shown in FIG. 4. In this position the lever 89 can no longer influence or open the drive switch 104. The flywheel 8 now rotates. At the same time the gear wheel 12 and the gear wheel 14 which is in mesh therewith are rotated.

As a result of the movement of the rod 62 the latching lever 58 (FIG. 2A) is pivoted about the spindle 59 and the latching pin 65 is positioned in the area of engagement with the heart-shaped projection 56, as shown in FIG. 2B.

As the gear wheel 14 is not in mesh with the gear wheel 24 the winding spindle 21 is not driven. The disc 42 is coupled to the winding spindle 21 by a separate slipping clutch and is therefore also stationary. Since no torque is exerted on the switching member 46 when the cassette is inserted, because the reels do not rotate and there is no tape transport, the switching member 46 remains in the position shown in FIG. 1 and the pin 49 is moved against the outer side of the guide wall 51. As a result of this, the switching member 46 is moved in a clockwise direction, as indicated by the arrow 46a, and the connecting member 52 is pivoted counterclockwise (indicated by the arrow 67). Since the latching lever 58 has pivoted and the pin 65 is positioned in the area of engagement with the heart-shaped projection 56, the pin 65 now travels along the wall 68 of the heart-shaped projection 56 and engages the recess 70. Thus, the connecting member is latched in a pivotal position (FIG. 2B). Owing to the pivotal movement of the connecting member 52 in counterclockwise direction indicated by the arrow 67, the limb 71 has moved inwards and is urged against the blade spring 72. The blade spring in its turn acts against the head-mounting plate 74 through the members 76 and 77 and urges this plate towards the capstan 10. The parts 46, 51, 52 and 71 thus constitute a servomechanism by means of which the head-mounting plate can be moved from a standby position to a play position. In the play position the pressure roller 79 is positioned against the capstan 10. The head-mounting plate 74 also abuts with a stop pin 78 (FIG. 5). This is the play position for the head-mounting plate in which the motor 3 runs and the magnetic tape is moved past the head 75. During the forward movement of the head-mounting plate the free end 107 of the pivotal lever 89 is disengaged from the stop 95. This has caused the spring 93 to return the lever 89 to the center position (FIG. 5). In this position the free end 107 of the switching lever 89, which also constitutes a switching surface, is situated opposite the roller 105 without touching it.

When the end of the tape is reached the tape stops. As a result of this, the switching member 46 with the pin 49 is again pivoted in the clockwise direction (arrow 46a). Consequently, the connecting member 52 is again pivoted counterclockwise (FIG. 2B) in the direction indicated by the arrow 67. During this movement the connecting member 52 is pivoted beyond the normal travel obtained when it is in its latched position. This overtravel is possible because the limb 71 acts against the blade spring 72 on the head-mounting plate 74 via the member 77 and the pin 76. Thus, it has room for a movement towards the head-mounting plate. During this overtravel the pin 65 leaves the recess 70 and the latching mechanism 57 is released. Under the influence of the spring 54 the released connecting member 52 is now pivoted clockwise, so that the limb 71 moves outwards. In this situation the head-mounting plate has moved outwards into the standby position shown in FIG. 6.

The pivotal lever 89 has then also moved outwards from its center position and the switching surface 107 has urged the nose 105 outwards, so that the contact points 103a and 106a are separated from each other. As a result of this the motor 3 is stopped. The actuating rod 62 is still in its outward position. The guide pin 84 is situated at the end of the guide portion 85. The cassette is still inside the apparatus and the pivotal lever 89 is still in the withdrawal position.

Figure 6:
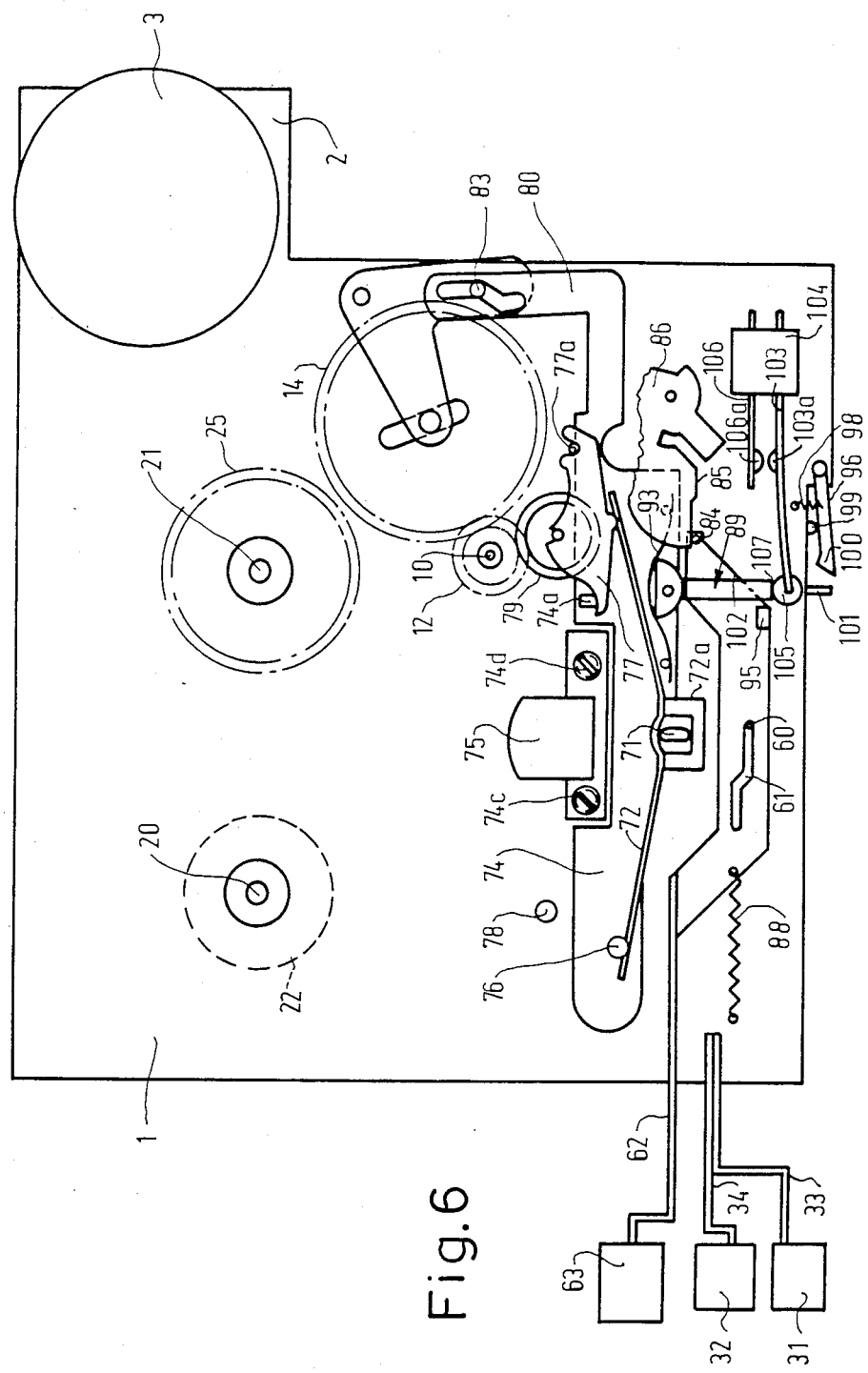
FIG. 6 shows the apparatus in the standby position to which it has been set when the end of tape is reached or when the actuating rod is depressed.

The standby position of the head-mounting plate can also be obtained by gently touching the button 63. The actuating rod 62 then moves inwards over a short length, the guide pin 68 moves over an oblique portion 61a in the guide slot 61 and thus reaches the dashed position shown in FIG. 2B. In this way the latching lever 58 has pivoted in a direction opposite to that indicated by the arrow 64. During this pivotal movement the pin 65 has left the recess 70 in the heart-shaped projection 56. The connecting member 52 is thus unlatched and can be pivoted in a direction opposite to that indicated by the arrow 67 by means of the spring 54. As a result of this, the limb 71 moves back and the head-mounting plate 74 is withdrawn by the spring 54. In this way the head-mounting plate 74 occupies the same position as assumed when the end of tape is reached. In this position which is shown in FIG. 6 the pivotal lever 89 is in its center position, because it has not abutted with the stop 95. The lever 89, which has moved back, now presses against the nose 105 and opens the switch 104. After the gentle depression of the button the rod 62 is returned immediately to its outward position by the spring 88.

Figure 7:
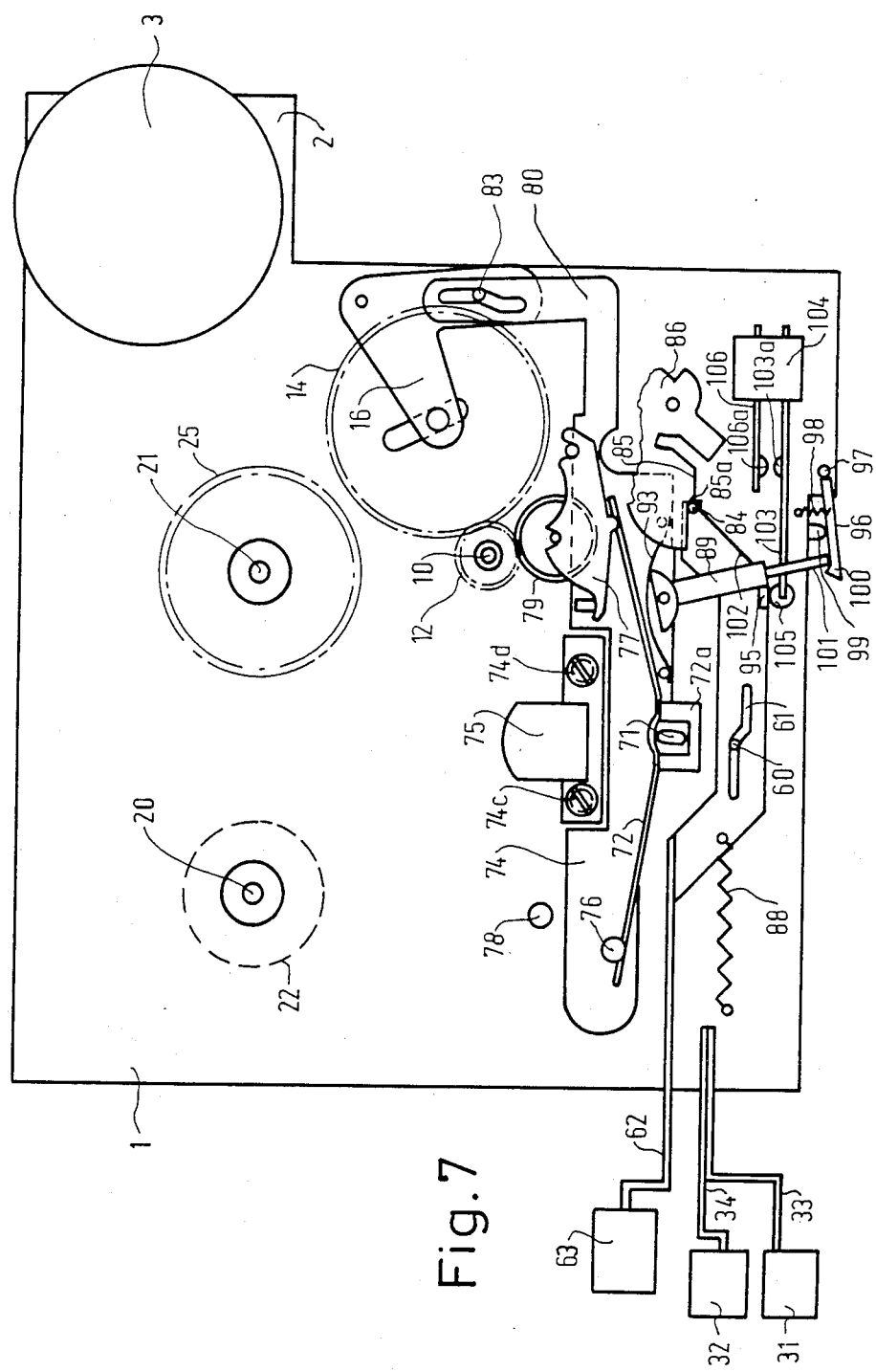
FIG. 7 shows the apparatus with the actuating rod depressed to start the apparatus but before it has actually started.

If the deck should now be reset to the mode in which the head-mounting plate 74 must be moved to the play position, the button 63 should be depressed a few millimeters only. The guide pin 84 on the actuating rod 62 then runs onto an oblique portion 85a (FIG. 7) of the guide profile 85. This results in a distinct increase in resistance to depression. The stop 95 then has pivoted the lever 89 to the right into the first pivotal position in which the extension 101 has engaged behind the latching hook 100. The nose 105 is now situated on the guide profile 102 and follows this profile. The switch 104 is still open (FIG. 7).

Figure 8:
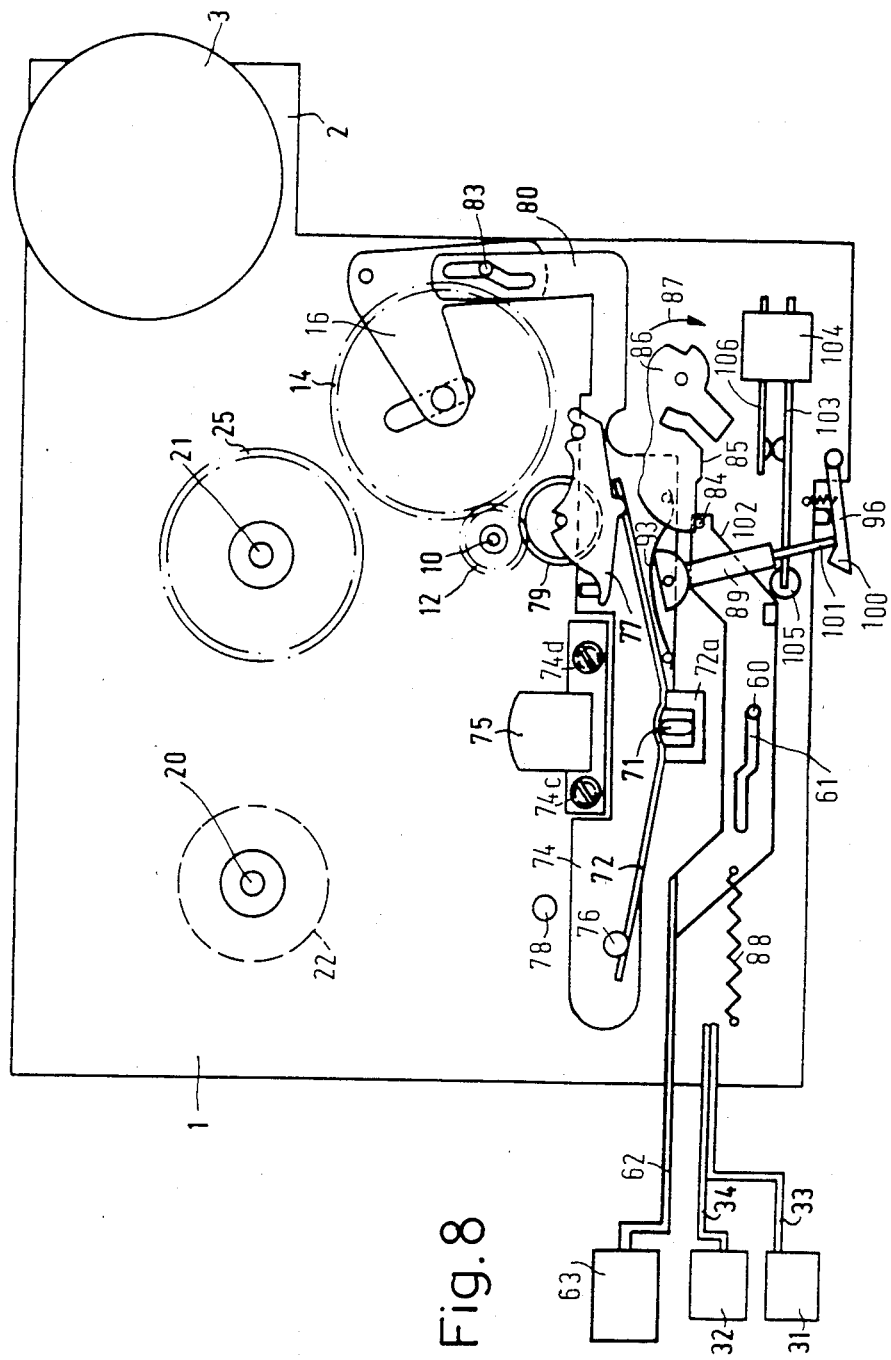
FIG. 8 shows the apparatus with the actuating rod released after starting of the servomechanism but with the head-mounting plate not yet returned to its play position.

After release of the button 63 the spring 88 again pulls the actuating rod 62 outwards. The roller 105 is then clear of the guide profile 102 and the drive switch 104 is closed. The switching lever 89 remains latched behind the latching hook 100 (FIG. 8). As a result of the closure of the drive switch 104 the motor 3 is started and, as described above, the servomechanism is put into operation again. Consequently, the head-mounting plate 74 moves forwards into the play position. During this movement the extension 101 is disengaged from the latching hook and the spring 93 urges the lever 89 into the center position. The position shown in FIG. 5 is now reached again. The deck is in the playing mode.

If a cassette is to be ejected the button 63 is depressed deeply, causing the loading and ejection lever 86 to be pivoted in a direction opposite to that indicated by the arrow 87. As a result of this, the pin 60 is moved inside the guide slot 61 into the position shown in FIG. 2A, so that the connecting member 52 is unlatched and the spring 54 withdrawns the head-mounting plate. During depression of the button 63 the stop 95 has moved the pivotal lever 89 to the right into the first pivotal position in which it is latched by the latching hook 100. Owing to the deep depression of the button 63 the stop 95 has moved past the pivotal lever 89 and has passed this lever after being pivoted into the first position. Now the position shown in FIG. 3 is occupied. The cassette has now been ejected by the lever 86 and a new cassette may be inserted.

What is claimed is:

1. A switching mechanism for a magnetic-tape-cassette deck comprising:

a head-mounting plate which can be moved forwards and backwards relative to the magnetic tape in a cassette which is inserted into the deck and is to be scanned, a tape transport means, and a drive switch for actuating said transport means, means for latching said plate in a forward position in a play mode of operation, and for unlatching the plate when the end of the tape is reached, a depressible actuating rod having a guide slot for unlatching the plate upon depression of the rod, and a switching profile for actuating said drive switch, and means, responsive to unlatching of said plate, for moving the plate back under spring pressure to a standby position in which the cassette remains inside the deck, characterized in that said plate carries a pivotable actuating member arranged such that, when said member is in a center position during return of said plate to the standby position, said member switches off the drive switch; and such that, when in a first pivotal position, said member does not influence said drive switch, said actuating member has a switching surface arranged such that, when said member is in the center position, said switching surface switches off the drive switch as the head-mounting plate returns to the standby position, said rod comprises a stop arranged such that, upon movement of the rod in a direction of depression after re-depression, said stop moves the actuating member from said center position to a first pivotal position, and the deck comprises a servomechanism for moving the plate from the standby position to a play position, and means for switching on said drive switch after said re-depression when said rod moves back in the opposite direction.

2. A mechanism as claimed in claim 1, characterized in that said member remains in the first pivotal position when the actuating rod is moved back in the opposite direction, and the drive switch remains closed when the actuating member pivots back into the center position past the drive switch under spring force, as the plate is moved forwards to the play position.

3. A switching mechanism for a magnetic-tape-cassette deck comprising:

a head-mounting plate which can moved forwards and backwards relative to the magnetic tape in a cassette which is inserted into the deck and is to be scanned, a tape transport means, and a drive switch for actuating said transport means, means for latching said plate in a forward position in a play mode of operation, and for unlatching the plate when the end of the tape is reached, a depressible actuating rod having a guide slot for unlatching the plate upon depression of the rod, and a switching profile for actuating said drive switch, and means, responsive to unlatching of said plate, for moving the plate back under spring pressure to a standby position in which the cassette remains inside the deck, characterized in that said plate carries a pivotable actuating member arranged such that, when said member is in a center position during return of said plate to the standby position, said member switches off the drive switch; and such that, when in a first pivotal position, said member does not influence said drive switch, said actuating member has a switching surface arranged such that, when said member is in the center position, said switching surface switches off the drive switch as the head-mounting plate returns to the standby position, said rod comprises a stop arranged such that, upon movement of the rod in a direction of depression after re-depression, said stop moves the actuating member from said center position to a first pivotal position, the deck comprises a servomechanism for moving the plate from the standby position to a play position, and means for switching on said drive switch after said re-depression when said rod moves back in the opposite direction, means for latching said member in said first pivotal position as said actuating rod moves in said opposite direction, and unlatching said member upon movement of said plate to the play position, and means for retaining said drive switch switched on as said plate is moved forwards to the play position and said member pivots back into the center position past the drive switch under spring force.

4. A mechanism as claimed in claim 1 or 3, characterized in that said member is a one-arm lever pivotable about a pivot, and the deck comprises a spring arranged to return said lever automatically from its first pivotal position to said center position.

5. A mechanism as claimed in claim 4, characterized in that said lever has a central axis, and a widened portion near said pivot and extending perpendicularly to said central axis, said spring being tensioned by said portion for urging said lever back into said center position.

6. A mechanism as claimed in claim 4, characterized in that said lever has a free end on which said switching surface is arranged, and an extension projecting from said free end, and said deck includes a latching hook for cooperation with said extension.

7. A mechanism as claimed in claim 6, characterized in that said lever is arranged so that it can be pivoted by said stop from said first position through said center position to a second position by said stop, in said second position said lever not influencing said drive switch.

8. A mechanism as claimed in claim 7, characterized in that said deck comprises a central tape-transport motor and in that said drive switch energizes said motor for moving said plate via said servomechanism.

9. A mechanism as claimed in claim 8, characterized in that said deck comprises a loading and ejection lever having a guide surface, and said actuating rod is an ejection rod which carries a guide pin, said guide pin being arranged to follow said guide surface.

10. A mechanism as claimed in claim 9, characterized in that said guide surface comprises an oblique portion onto which said guide pin runs when the ejection rod is depressed again, to cause a distinct increase in resistance to depression, thereby providing to a user an indication that said lever has reached said first position.

11. A mechanism as claimed in claim 1 or 3, characterized in that said deck comprises a loading and ejection lever having a guide surface, and said actuating rod is an ejection rod which carries a guide pin, said guide pin being arranged to follow said guide surface.

12. A mechanism as claimed in claim 11, characterized in that said guide surface comprises an oblique portion onto which said guide pin runs when the ejection rod is depressed again, to cause a distinct increase in resistance to depression, thereby providing to a user an indication that said lever has reached said first position.

* * * * *

UNITED STATES PATENT AND TRADEMARK OFFICE
CERTIFICATE OF CORRECTION

PATENT NO. : 4,649,446

DATED : March 10, 1987

INVENTOR(S) : Arnim Deutsch et al.

It is certified that error appears in the above-identified patent and that said Letters Patent is hereby corrected as shown below:

On the Title Page, Item [75] "Arnim" should read --Armin--.

Signed and Sealed this

Ninth Day of February, 1988

Attest:

DONALD J. QUIGG

Attesting Officer

Commissioner of Patents and Trademarks